United States Patent
Yamamoto et al.

(10) Patent No.: US 6,379,457 B1
(45) Date of Patent: Apr. 30, 2002

(54) CEMENT MOLDINGS CONTAINING VEGETABLE FIBER AND METHOD FOR PRODUCING THE SAME

(75) Inventors: Masahiko Yamamoto, Ibaraki-ken; Hajime Karibe; Sachiko Sotokawa, both of Chiba-ken; Hiroshi Harada, Saitama-ken, all of (JP)

(73) Assignee: A & A Material Corporation, Tokyo (JP)

( * ) Notice: Subject to any disclaimer, the term of this patent is extended or adjusted under 35 U.S.C. 154(b) by 0 days.

(21) Appl. No.: 09/622,913
(22) PCT Filed: Mar. 3, 1999
(86) PCT No.: PCT/JP99/01023
§ 371 Date: Sep. 6, 2000
§ 102(e) Date: Sep. 6, 2000
(87) PCT Pub. No.: WO99/44963
PCT Pub. Date: Sep. 10, 1999

(30) Foreign Application Priority Data

Mar. 6, 1998 (JP) .......................... 10-055525
Feb. 8, 1999 (JP) .......................... 11-029858

(51) Int. Cl.[7] .............................. C04B 18/24
(52) U.S. Cl. .................. 106/731; 264/241; 264/333; 264/DIG. 43
(58) Field of Search .................. 106/731; 264/333, 264/241, DIG. 43

(56) References Cited

U.S. PATENT DOCUMENTS 4,923,665 A * 5/1990 Anderson et al. .......... 264/259

* cited by examiner

Primary Examiner—Paul Marcantoni
(74) Attorney, Agent, or Firm—Oblon, Spivak, McClelland, Maier & Neustadt, P.C.

(57) ABSTRACT

A vegetable fiber cement moulded body of the present invention includes a nitrate as an additive agent. A method of manufacturing the same includes the steps of mixing raw materials including at least a vegetable fiber material, cement and water, moulding the mixed material, and curing this molded body, wherein a nitrate is added at the time of the aforementioned raw material mixing step or the aforementioned molding step. The molded body is preferably heated at the time of the curing step. According to the present invention, a vegetable fiber cement molded body of high strength which is not easily affected by substances that inhibit cement hardening and a method of manufacturing the same efficiently and at low cost are provided.

11 Claims, 1 Drawing Sheet

CEMENT MOLDINGS CONTAINING VEGETABLE FIBER AND METHOD FOR PRODUCING THE SAME

TECHNICAL FIELD

The present invention relates to a vegetable fibre cement moulded body which utilises vegetable fibre as a reinforcing material and to a method of manufacturing the same.

BACKGROUND ART

Vegetable fibre cement moulded bodies, for example, vegetable fibre cement boards, are normally manufactured by kneading ligneous fibre obtained by processing wood into flakes, excelsior, wood fibre, and the like, or bamboo fibre obtained by processing bamboo in a similar manner, various types of cement, and water, and moulding this kneaded material, followed by curing and hardening of the cement. As sources of ligneous fibre, various kinds of softwood and hardwood timber are widely used. However, recent years have seen a tendency toward timber shortages, and wood conservation is also required from the viewpoint of global environmental protection. As raw materials to replace wood, bamboo materials, which grow rapidly compared to softwood and hardwood timber, and are strong and have a high degree of resiliency, have been gaining attention. However, bamboo materials contain soluble sugars, soluble resins, or the like, which are well known as substances that inhibit the hardening of cement. Therefore, in order to put into practical use materials which contain a large amount of substances that inhibit cement hardening, such as bamboo materials, as raw materials for vegetable fibre materials, an arrangement is necessary for facilitating the smooth hardening of cement.

The following methods have been conventionally proposed as methods of eliminating the cement hardening inhibition caused by the soluble sugars and resins contained in vegetable fibre materials.

For example, a method is cited wherein hardening of cement is promoted by impregnating or mixing in with the vegetable fibre materials metallic salts such as calcium chloride, magnesium chloride, aluminium chloride (Japanese Patent Laid-Open No. 51-26930, Japanese Patent Laid-Open No. 51-151722, Japanese Patent Laid-Open No. 60-118658). Furthermore, Japanese Patent Publication No. 55-14827 discloses a method of rapidly hardening and moulding a ligneous cement moulding wherein a ligneous raw material is made into fine pieces and mixed with water and ultra-rapidly hardening cement to which ferric chloride is added and mixed and then hardened and moulded by heating and pressure-fastening in the range of 90–120° C.

In the above-described method in which a hardening acceleration agent is added, hardening of cement is performed under conditions of pressurisation and heating with the use of, for example, a hot press method, steam curing in a state of fastening, or the like. However, in a system which uses a vegetable fibre material containing a large amount of a substance that inhibits cement hardening, such as a bamboo fibre material, cement does not easily harden at ordinary temperatures, and even if the cement hardens, the strength of the resulting moulded body is extremely low. In addition, for metallic salts used as hardening acceleration agents, chloride types are commonly used; in cases where a chloride-type hardening acceleration agent is used in a construction material, there is a fear that metallic parts such as screws for fastening will rust at the time of constructing the resulting moulded body, and that metallic parts of kneading machines, iron plates for moulding, and the like, will rust at the time of producing the moulded body. In a system wherein a vegetable fibre material containing a large amount of a substance that inhibits cement hardening is used, there is also a fear that since hydration of the cement is markedly delayed, these hardening acceleration agents will not work effectively.

Another method is cited wherein resin portions within excelsior are removed in advance by soak-treating it in river water, sea water, and/or a chemical solution, and using the resulting excelsior (Japanese Patent Laid-Open No. 55-164054). Here, it is stated that, in order to remove the resin portions within the excelsior raw material to an extent which does not adversely affect the production of the excelsior cement boards, it is necessary to pre-soak the excelsior in water for 2 to 10 hours, depending on the type of resin, using mainly cold water in the range of 1 to 45° C. In this case, since a long period of time is required for the soaking treatment, it cannot be denied that there is a reduction in productivity. Moreover, in order to obtain stable product quality, a long period of time is required for soaking, and there is an apprehension that the product quality will vary depending on the type of wood used. Furthermore, Japanese Patent Publication No. 61-4784 discloses a method of manufacturing a ligneous cement board characterised in that the ligneous material is treated beforehand with a salt having 1 or more sulphate radicals selected from the group consisting of magnesium sulphate, calcium sulphate, aluminium sulphate and zinc sulphate, calcium hydroxide and/or calcium carbonate, and 1 or more carboxylic acids selected from the group consisting of formic acid, acetic acid, and oxalic acid, and cement is then mixed in. Moreover, Japanese Patent Publication No. 61-5422 discloses a method of manufacturing a ligneous cement board characterised in that a treatment for preventing the inhibition of the cement hardening of a ligneous material is performed with an aluminium salt of a strong acid and an acetate, and the ligneous material which has undergone this cement hardening inhibition treatment is used to manufacture the ligneous cement board. These treatments all bring about an increase in the cost of the draining process for soaking treatment solutions and in running costs.

There is also a method wherein a substance that inhibits cement hardening in a ligneous material is made insoluble by treatment with paraformaldehyde or formalin (Japanese Patent Laid-Open No. 50-127925). However, the pharmaceuticals used in this method are dangerous, and expenses are incurred for chemical waste treatment facilities, work site, environment facilities and the like, which leads to an increase in costs.

Furthermore, Japanese Patent Publication No. 5-65455 discloses a method of manufacturing a ligneous cement board by kneading a ligneous material, cement and water to form a mixed mat, then moulding the mixed mat by pressure-fastening, and curing and hardening, wherein a metallic compound comprising 1 or more substances selected from sulphates, chlorides, or hydroxides of iron, copper, zinc or lead is mixed into the kneading water, and the metallic compound is bonded to a component extracted from the ligneous material to form a highly stable complex, thereby preventing cement hardening inhibition due to the extracted component.

Furthermore, Japanese Patent Laid-Open No. 8-2954 discloses a method of treating a ligneous reinforcing material characterised in that a surface of the ligneous reinforcing material is coated with calcium carbonate by adding to and mixing in the ligneous reinforcing material calcium hydroxide and bicarbonate of an alkali metal and/or ammonia and heating.

The above-mentioned conventional technologies are methods which prevent substances that inhibit hardening from diffusing into cement by causing gelling to start while the amount of the substances which inhibit cement hardening (soluble sugars and resins, and the like) being eluted from a vegetable fibre material which has been mixed in a mixture of raw materials as a reinforcing material is relatively small, or a method which prevents substances that inhibit cement hardening from being eluted into the cement by pretreating the vegetable fibre material for reinforcement with a chemical. However, in cases where bamboo fibre and the like, which contains a large amount of soluble sugars and resins, as compared to such ligneous fibre materials for reinforcement as softwood and hardwood timber, is used as a vegetable fibre material for reinforcement, since there is a possibility that the soluble sugars and resins will be eluted before the cement hardens, there is a fear that the hardening of the cement will be inhibited. Even if a hardening acceleration agent is added in cases where the hardening is inhibited, it is difficult to revert the delayed hydration reaction back to normal. Moreover, it is difficult to completely coat the surface of these vegetable fibre materials with chemicals and the like, and the inadequacy of the coating, similar to the above-mentioned case, leads to the apprehension that the hardening will be inhibited. It has thus been difficult to obtain a stable product of high quality.

On the other hand, current production of vegetable fibre cement moulded bodies generally has the steps of: mixing at least vegetable fibre material, cement and water as the main raw materials; moulding the mixed raw material on a template; placing in multiple layers a complex of this moulded body and the template, which are fastened together while being pressurised; curing while fastened until handling of the moulded body becomes possible; and unfastening to separate the moulded body and the template (hereinafter referred to as detachment); and this method is frequently employed at present. In order to perform detachment, it is necessary for the moulded body to possess shape retention properties and the strength to withstand the handling. The reason for placing the moulded raw material in multiple layers is that, since it is normal for "time required to mould one moulded body<<time required for 1 cycle of pressurisation/fastening", it is desirable to achieve "time required to mould one moulded body x no. of layers≧time required for 1 cycle of pressurisation/fastening" in order to manufacture moulded bodies efficiently. Moreover, fastening one on one, or a small number of layers requires an extremely large number of pieces of fastening equipment, which is unrealistic.

However, if the placing in multiple layers takes time, the cement hardening reaction of the material which has been moulded on the template earlier proceeds before the pressure-fastening, which results in the strength of the manufactured vegetable fibre cement moulded body being low (the strength of the vegetable fibre cement moulded body only manifests when the cement is caused to undergo hydration reaction while being pressure-fastened). Furthermore, in a case where the step of placing in multiple layers is interrupted due to some trouble, the operational time is further increased. In particular, in cases where a cement hardening acceleration agent is used, as conventionally proposed, if the placing in multiple layers takes time, the cement hardening reaction proceeds before the pressure-fastening, which results in the manufactured moulded body having markedly insufficient strength.

The object of the present invention is therefore to provide a vegetable fibre cement moulded body of high strength which is not easily affected by substances which inhibit cement hardening and a method of manufacturing it efficiently and at low cost.

Another object of the present invention is to provide, in the manufacture of vegetable fibre cement moulded bodies as frequently employed at present such as described above, a method of manufacturing a vegetable fibre cement moulded body wherein the cement hardening reaction of a material placed on a template does not easily proceed before pressure-fastening, the curing time required from the completion of the fastening up to the detachment step is reduced, the metallic equipment parts involved in the manufacturing of the moulded body are not corroded, and which is low in cost.

DISCLOSURE OF THE INVENTION

The present inventors have succeeded in solving the above conventional problems as a result of strenuous research.

That is to say, the present invention provides a vegetable fibre cement moulded body including at least a vegetable fibre material and cement characterised in that the vegetable fibre cement moulded body contains a nitrate as an additive agent.

Furthermore, the present invention provides a vegetable fibre cement moulded body as aforementioned wherein the nitrate content is 0.5–10% by weight relative to the total amount of solid raw material.

Moreover, the present invention provides a vegetable fibre cement moulded body as aforementioned wherein the nitrate is 1 or more kinds selected from the group consisting of magnesium nitrate, ferric nitrate, nickel nitrate and aluminium nitrate.

In addition, the present invention provides a method of manufacturing a vegetable fibre cement moulded body including a step of mixing a raw material that includes at least a vegetable fibre material, cement and water, a step of moulding the mixed material, and a step of curing this moulded body, characterised in that a nitrate is added at the time of the aforementioned raw material mixing step or the aforementioned moulding step.

Furthermore, the present invention provides a manufacturing method as aforementioned wherein the nitrate is added in the form of an aqueous solution.

Moreover, the present invention provides a method of manufacturing a vegetable fibre cement moulded body including a step of mixing a raw material that includes at least a vegetable fibre material, cement and water, a step of moulding the mixed material on a template, a step of stacking multiple layers of composites of this moulded body and the template, a step of pressurising as well as fastening while under pressurisation the aforementioned stacked multiple layers of composites, a step of curing the fastened moulded bodies until their handling becomes possible, and a step of unfastening and separating the aforementioned moulded bodies and templates, characterised in that a nitrate is added at the time of the aforementioned raw material mixing step or moulding step and that a heat treatment is implemented for the moulded bodies in the aforementioned curing step.

Furthermore, the present invention provides a manufacturing method as aforementioned wherein the heat treatment is performed at a temperature between 50° C. or more and less than 100° C.

Moreover, the present invention provides a manufacturing method as aforementioned wherein the heat treatment is performed at a temperature of 60–80° C.

In addition, the present invention provides a manufacturing method as aforementioned wherein the heat treatment is steam curing.

Furthermore, the present invention provides a manufacturing method as aforementioned wherein ordinary curing is performed before the heat treatment.

Moreover, the present invention provides a manufacturing method as aforementioned wherein secondary curing of the moulded bodies separated from the template is performed by ordinary curing.

DETAILED DESCRIPTION OF THE INVENTION

Figure 1:
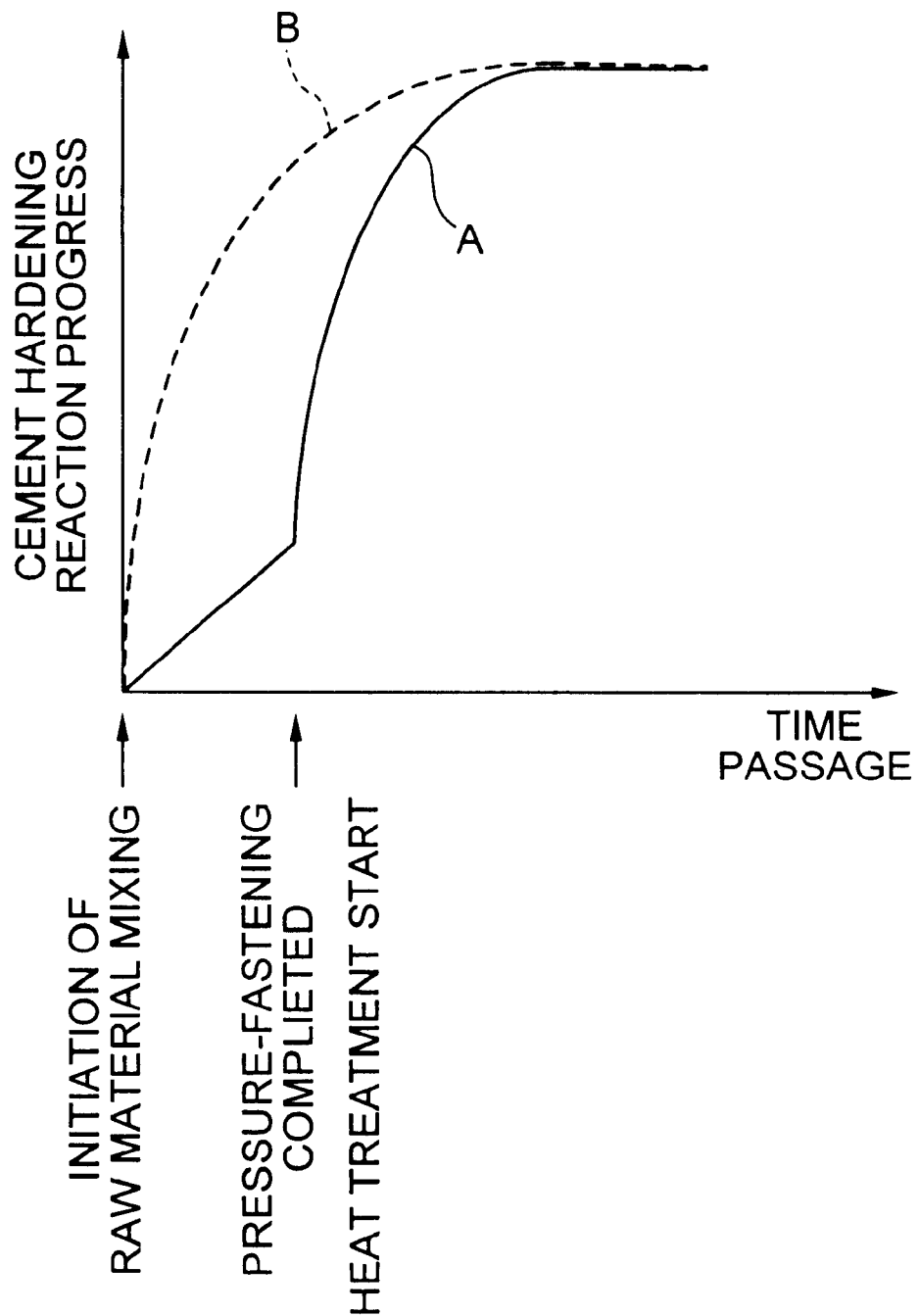
FIG. 1 is a graph which illustrates the relationship between the passage of time during the manufacturing process of a vegetable fibre cement moulded body and the degree of progress of the cement hardening reaction in the present invention.

The present invention provides a vegetable fibre cement moulded body having high strength by preventing the delay of the hydration reaction of cement caused by substances that inhibit cement hardening in the vegetable fibre material, which prevents the vegetable fibre cement moulded bodies from reaching their full strength, by means of the addition of a nitrate, and a method of manufacturing the same efficiently and at low cost.

Furthermore, the present invention comprises, in the methods of manufacturing vegetable fibre cement moulded bodies which are at present frequently employed, the addition of a nitrate as above and the heat-treatment of the moulded body in a curing step so as to cause the cement hardening reaction to proceed mainly after pressure-fastening, thereby reducing the curing time required from the completion of the pressure-fastening up to a detachment step.

A vegetable fibre cement moulded body of the present invention is further described below.

First, vegetable fibre material as described in the present specification is a generic term for ligneous fibre represented by softwood or hardwood timber, bamboo fibre, sugarcane fibre, palm tree fibre, and the like. Moreover, vegetable fibre material is a generic term for the above fibres having such shapes as needle-like, chip-like, thin section-like, strand-like, rod-like, fibre-like, flake-like, and the like. Furthermore, vegetable fibre material includes hemp fibre, bagasse and the like containing lignocellulose as its main component. It is to be noted that there is no particular restriction on the shape of these vegetable fibre materials, but it is preferable that those having an average fibre length of 10–50 mm, and an average fibre diameter or average fibre thickness of 0.5 mm or less be used. Moreover, the vegetable fibre material may be a mixture of 2 or more of the above fibres.

In the vegetable fibre cement moulded body of the present invention, the proportion of the above vegetable fibre material to be added (bone dry weight) is in the range of 10–45% by weight, preferably of 25–35% by weight. It is to be noted that the aforementioned % by weight is a value relative to the total dry weight of the vegetable fibre material (bone dry weight), cement and mixed materials (agents) used as necessary, which are described below (hereinafter referred to as solid raw materials).

Here, an addition proportion which is less than 10% by weight results in the vegetable fibre material having a small effect in terms of reinforcement, which in turn results in the vegetable fibre cement moulded body obtained having a low flexural strength, and therefore is not desirable. An addition proportion exceeding 45% by weight makes it impossible to uniformly coat all the surface of the fibres with the cement, thereby reducing the strength, and therefore is not desirable, either.

As the cement which can be used for the vegetable fibre cement moulded body of the present invention, hydraulic cement such as Portland cement, blast-furnace cement in which blast-furnace slag is mixed in Portland cement, fly-ash cement having fly ash mixed in silica cement having a silica substance such as volcanic ashes, silica fume, siliceous earth mixed in, and alumina cement can be cited as examples.

In the vegetable fibre cement moulded body of the present invention, the proportion of the above cement to be added needs to be 50% by weight or more relative to the solid raw material, and preferably in the range of 65–75% by weight. With a proportion lower than 50% by weight, the absolute quantity of the cement constituting a matrix is not enough, which causes a reduction in strength. Since the present invention contains at least 10% by weight or more of the vegetable fibre material relative to the solid raw material, the maximum proportion of the cement to be added is 90% by weight.

Furthermore, in the present invention, water is preferably in the range of 20–60% by weight relative to the solid raw material. The moisture contained in the vegetable fibre material is also considered to be part of this mixed-in water. A proportion of less than 20% by weight brings about a risk that there will not be enough moisture, for the hydration reaction of the cement, and a proportion exceeding 60% by weight causes moisture to be squeezed out of the moulded body when pressurised, which in turn causes the cement and the like to move, or the cement adhering to the surface of the vegetable fibres to be desorbed, bringing about a risk of the moulded body becoming uneven. Therefore, such properties are not desirable.

The nitrate to be added as an additive agent to the vegetable fibre cement moulded body of the present invention acts to prevent the delay of the hydration reaction of the cement caused by cement-hardening inhibiting substances contained in the vegetable fibre material. Here, the effect of recovering hydration reaction of nitrates varies greatly depending on the kind of metal ion, a listing of the kinds of metal ions based on the efficacy of recovery being, in descending order, as follows: $Mg^{2+}$, $Fe^{3+}$, $Ni^{2+} > Al^{3+} > Ca^{2+} > K^+$. Thus, the nitrates which can be used as additive agents in the present invention are preferably magnesium nitrate [$Mg(NO_3)_2$], ferric nitrate [$Fe(NO_3)_3$], nickel nitrate [$Ni(NO_3)_2$], aluminium nitrate [$Al(NO_3)_3$], and the like, and magnesium nitrate, ferric nitrate and nickel nitrate are particularly preferable. The quantity of such nitrates to be added is in the range of 0.5–10% by weight relative to the total amount of the solid raw material, and preferably, 4–10% by weight.

Other than the above nitrates, calcium nitrate, potassium nitrate and the like can also be used, but compared to the above-mentioned nitrates, these are not as efficient in preventing delay of the hydration reaction of the cement caused by the substances which inhibit cement hardening, necessitating an increase in the addition proportion or use in combination with the above nitrates which possess a high degree of effectiveness in prevention. That is to say, in cases where these nitrates are added, the quantity of such nitrates to be added is in the range of 0.5–10% by weight relative to the total amount of the solid raw material, and preferably 7–10% by weight.

If the nitrate is added in a proportion of less than 0.5% by weight, this is insufficient to prevent the delay of the hydration reaction of the cement caused by the cement-hardening inhibiting substance, while if the addition proportion exceeds 10% by weight, the manifestation of the effect is saturated, and therefore it simply leads to an increase in raw material costs, so such proportions are not desirable.

The nitrate can be added when mixing the vegetable fibre material, cement and water, or when moulding the mixture including the vegetable fibre material, cement and water on the template. At this time, the nitrate may be added as is, or alternatively can be dissolved beforehand in water and added in the form of an aqueous solution; addition in the form of an aqueous solution is preferable. That is to say, the nitrate can be mixed beforehand, in the form of a powder, with the cement and another powder component which is an optional component, and added. However, since there are many nitrates which contain hydration water, it is more effective for the nitrate to be added by dissolving it beforehand completely and uniformly in the water to be added, and spraying the obtained aqueous solution uniformly onto the other components.

Furthermore, in addition to the above essential components, the following substances can be added, as required, to the vegetable fibre cement moulded body of the present invention as a mixed material (agent) in a range which does not affect the physical properties of the vegetable fibre cement moulded body:

(1) plate-like crystal such as mica;
(2) needle-like crystal such as wollastonite
(3) inorganic fine powder such as silica fume, diatomaceous earth, fly ash;
(4) inorganic or organic extenders such as calcium carbonate, perlite, Shirasu balloon, styrene;
(5) clay minerals such as bentonite, kaolin, vermiculite;
(6) fibre-like minerals such as palygorskite, sepiolite
(7) porous mineral powder such as zeolite;
(8) fibres for reinforcement such as organic synthetic fibre, glass fibre, pulp fibre, metallic fibre;
(9) synthetic resin emulsion; and
(10) additives such as colouring agents, waterproofers.

The components in (1)–(8) above can be used such that the total quantity thereof is 35% by weight or less relative to the solid raw material. As for the components in (9), use within 10% by weight relative to the solid raw material is preferable. Furthermore, the components in (10) can each be added in a quantity that is within 5% by weight relative to the solid raw material.

The vegetable fibre cement moulded body of the present invention can be manufactured by mixing the aforementioned vegetable fibre material, cement, nitrate and water, as well as other components as required; moulding the resulting kneaded material, for example, in a mat-like form on a template having an appropriate shape (it should be noted that, as described above, the nitrate can be added at the time of this moulding); and pressure-fastening the resulting moulded body by means of a press or the like, after which curing is performed.

According to a preferred embodiment, the vegetable fibre cement moulded body of the present invention can be manufactured by mixing the aforementioned vegetable fibre material, cement, nitrate and water, as well as other components as required; moulding the resulting kneaded material, for example, in a mat-like form on a template having an appropriate shape (it should be noted that, as described above, the nitrate can be added at the time of this moulding); placing the resulting moulded body together with the template in multiple layers; pressurising by a press or the like, while fastening in the state of pressurisation; then curing until the handling of the moulded body is made possible by the hardening of the cement; unfastening; and performing detachment.

One of the characteristics of this embodiment is heat treatment of the moulded body during the above curing step. This heat treatment makes the cement hardening reaction proceed rapidly, which makes possible a reduction in the time required until detachment.

The heat treatment in the present invention is preferably performed at a temperature between 50° C. or more and less than 100° C., more preferably at a temperature of 60–80° C. There is no restriction on the means of heat treatment provided that the means is able to raise appropriately the temperature of the moulded body, but if it is performed, for example, by steam curing, the moisture contained in the moulded body does not evaporate during the heat treatment, so failure of the reaction of the cement that would be caused by any shortage of moisture does not occur, which is preferable.

Heat treatment facilitates elution of substances that inhibit cement hardening, such as soluble sugars or soluble resins contained in the vegetable fibre; it is therefore preferable for ordinary curing of the moulded body to be performed after the pressure-fastening for a prescribed period of time, for example, 1 hour or more, the nitrate thereby acting to prevent to some extent the influence of the eluted "inhibiting substances", and for the heat treatment to be performed, as the reaction of the cement hardening after the pressure-fastening thus proceeds more rapidly. The ordinary curing referred to herein means curing in which the moulded body is hardened by causing the cement to undergo hydration reaction with the ambient temperature at an ordinary temperature (room temperature). Performing ordinary curing for a long period of time does not adversely affect the physical properties of the resulting moulded body in any way, but taking into consideration the object of the present invention to reduce the time from the ending of pressure-fastening up to detachment, 8 hours or less is preferable.

Furthermore, secondary curing of the moulded body separated from the template through the detachment step by ordinary curing is preferable since this increases the strength of the resulting vegetable fibre cement moulded body.

Various hypotheses have been proposed regarding the mechanism whereby the substance which inhibits cement hardening and which is eluted from the vegetable fibre material into the mixture of raw materials causes a delay in the hydration reaction of the cement at the time of manufacturing the vegetable fibre cement moulded body. It is said that the cement-hardening inhibiting substance forms a complex with the calcium ions in the cement to become a complex salt which covers the surface of unhydrated cement particles, thus preventing the precipitation of calcium hydroxide crystals, whereby the hydration reaction of the cement is delayed and setting and hardening are delayed. It is thought that addition of the nitrate to the mixture of raw materials makes it possible for the metal ions, when becoming hydroxide, to cause coprecipitation of the substances which inhibit cement hardening while they are in the liquid phase, the concentration of the cement-hardening inhibiting substance in the liquid phase portion thus being reduced, and the cement-hardening inhibiting substance adsorbed by the cement being desorbed and moving to the liquid phase. It is considered that causing the layer of the cement-hardening inhibiting substance adsorbed by the cement to become unstable by adding the nitrate in such a manner acts to prevent the delay in the hydration reaction that would be caused by the cement-hardening inhibiting substance, thereby making it possible to provide a vegetable fibre cement moulded body of high strength without any inhibition of the cement hardening.

Moreover, stimulating the moulded body by heating during the curing step causes the cement hardening reaction to proceed rapidly, thereby reducing the time up to detachment, and increasing productivity.

Further description will be given with reference to a drawing. FIG. 1 is a graph which illustrates the relationship between the passage of time during the manufacturing process of a vegetable fibre cement moulded body and the degree of progress of the cement hardening reaction in the present invention. Solid line A is a curve relating to the manufacturing method of the present invention. The progress of the cement hardening reaction is not favourable until the mixture of the raw materials is moulded on a template in, for example, a mat-like form, placed in multiple layers, and pressure-fastened by clamps or the like, as described above. According to the present invention, the cement hardening reaction does not proceed rapidly until the mixture of the raw materials is moulded in a mat-like form and pressure-fastened, this being a characteristic of the reaction of the cement which is affected simultaneously by the cement-hardening inhibiting substance contained in the vegetable raw material and by the nitrate. However, by heat-treating the moulded bodies at a desired point in time, that is to say, after the completion of the pressure-fastening of the moulded body which have been placed in multiple layers, the cement hardening reaction proceeds rapidly, and detachment becomes possible within a short time. Ample strength for a fibre-reinforced cement moulded body is obtained, for example, in 2 weeks after the detachment step. Moreover, almost no difference in strength is perceived between the top and bottom when subjected to loading. In contrast, broken line B is a curve for an example in which a conventional cement hardening acceleration agent is used. As seen by broken line B, the cement hardening reaction proceeds at a notably high speed from the time when the mixing of the raw materials is started, and there is a risk that the desired strength of the moulded body can no longer be obtained, even with pressure-fastening.

BEST MODE FOR CARRYING OUT THE INVENTION

The present invention is described in detail below on the basis of the examples. A bamboo material is used as the raw material for the vegetable fibre, as it is known for the high content of substances that inhibit cement hardening.

EXAMPLES 1–4

A Thai-grown bamboo material (PAITONG DHAM) cut to be approximately 200 mm long in the growth direction of the bamboo raw material and approximately 30 mm wide was made into fibres of 5–60 mm in length (average fibre length: 15 mm) and 0.1–3.0 mm in diameter (average fibre diameter: 0.45 mm) using a hammer crusher (manufactured by Yugen Kaisha Asahi Sangyo). The moisture content of the bamboo fibre obtained at this time was 67% by weight. Moisture content of the vegetable fibre material as described in the present specification has the following definition:

Moisture content (% by weight)=(weight of vegetable fibre material containing moisture−weight of vegetable fibre material in bone dry state)/weight of vegetable fibre material in bone dry state×100

Next, the bamboo fibre and ordinary Portland cement were mixed so that the proportions thereof were 30:70 in terms of bone dry weight, and 130 parts by weight of water, relative to 100 parts by weight of the bamboo fibre in the bone dry state, was added.

To prepare the test pieces, bamboo fibre having its moisture content adjusted in advance to 100% by weight with the use of a sprayer and ordinary Portland cement were kneaded uniformly, and then a magnesium nitrate solution prepared by completely dissolving magnesium nitrate into the remaining 30 parts by weight of water was added uniformly to the kneaded material by means of a sprayer. The magnesium nitrate used was the special-grade reagent magnesium nitrate hexahydrate [$Mg(NO_3)_2 \cdot 6H_2O$] manufactured by Kanto Kagaku Kabushiki Kaisha.

The resulting kneaded material was moulded into uniform mats 180 mm in length×100 mm in width×70 mm in thickness on iron plates as a template, which were then press-compressed using a pressure of 20kgf/cm$^2$. The iron plates were fastened by clamps, and then removed from the press, and curing was performed in the state of pressure-fastening.

With regard to the curing state, primary curing was performed in polyethylene bags at 30° C. for 24 hours in a sealed state. After the completion of the primary curing, the clamps were removed, the iron plates were detached, and cutting was performed, after which one part was submitted to a strength test as described below, and for the other part, further secondary curing was performed. The secondary curing was performed at 30° C. for 14 days sealed in a polyethylene bag. After completion of the secondary curing, drying at 60° C. for 24 hours was performed, and a physical properties test was performed as described below. The proportion of magnesium nitrate added was 2.8% by weight, 4.2% by weight, 5.6% by weight and 7.0% by weight relative to the solid raw material in Examples 1, 2, 3 and 4 respectively.

The strength of the moulded body which had been detached was measured by cutting the moulded body into a 160 mm×40 mm size and implementing a bending test with a span of 120 mm and centre line loading. As for the physical properties test of the moulded body after the secondary curing, such properties as bulk specific gravity, 14-day strength (flexural strength), and $\rho$=1.1 converted strength were examined.

$\rho$=1.1 converted strength is expressed as (1.1/specimen's bulk specific gravity)$^2$×specimen's strength.

It is known that the flexural strength of moulded bodies of a fibre-reinforced cement board with a uniform composition is roughly in direct proportion to the square of the bulk specific gravity of the moulded bodies. Therefore, there is a need to correct the flexural strength when the moulded bodies to be compared have different bulk specific gravities. Specifically, in the present Examples, the bulk specific gravity of a standard moulded body was defined as 1.1 and the flexural strength measured was corrected by adopting the above equation.

Measurement results of various properties of the vegetable fibre cement moulded body obtained are shown in Table 1.

COMPARATIVE EXAMPLE 1

Example 1 was repeated except that the magnesium nitrate was not added. The results are shown in Table 2.

COMPARATIVE EXAMPLE 2

Example 1 was repeated except that calcium chloride was used instead of the magnesium nitrate. The results are shown in Table 2.

COMPARATIVE EXAMPLE 3

Example 1 was repeated except that aluminium sulphate was used instead of the magnesium nitrate. The results are shown in Table 2.

TABLE 1

|  | Example 1 | Example 2 | Example 3 | Example 4 |
|---|---|---|---|---|
| Strength at detachment (kgf/cm$^2$) | 14 | 23 | 32 | 48 |
| Bulk specific gravity | 1.09 | 1.19 | 1.25 | 1.27 |
| 14-day strength (kgf/cm$^2$) | 47 | 109 | 148 | 194 |
| $\rho = 1.1$ converted strength of 14-day strength (kgf/cm$^2$) | 48 | 93 | 115 | 146 |

Curing conditions
at 30° C. for 24 hours as primary curing
at 30° C. for 14 days as secondary curing

TABLE 2

|  | Comparative Example 1 | Comparative Example 2 | Comparative Example 3 |
|---|---|---|---|
| Strength at detachment (kgf/cm$^2$) | 1.3 | 4.5 | 10.2 |
| Bulk specific gravity | 0.98 | 1.16 | 1.19 |
| 14-day strength (kgf/cm$^2$) | 2.3 | 11 | 19 |
| $\rho = 1.1$ converted strength of 14-day strength (kgf/cm$^2$) | 2.9 | 9.4 | 16.5 |

Curing conditions
at 30° C. for 24 hours as primary curing
at 30° C. for 14 days as secondary curing As can be seen from the results in Tables 1 and 2 above, the vegetable fibre cement moulded body obtained by mixing the vegetable fibre material, cement and water only, moulding the obtained mixture of the raw materials, curing and hardening the moulded body has an extremely low strength due to occurrence of the inhibition of hardening of the cement, and cannot be used as a construction material. Furthermore, even if hardening acceleration agents such as calcium chloride and aluminium sulphate are added, in the case where a vegetable fibre material such as bamboo fibre, which contains a large amount of substances that inhibit cement hardening, is used, it is difficult to obtain an effect from adding the hardening acceleration agents. However, by adding the nitrate to the mixture of raw materials and thereby preventing the delay of the hydration reaction, a vegetable fibre cement moulded body of high strength could be obtained.

EXAMPLE 5

The bamboo fibre described in Example 1 and ordinary Portland cement were mixed so that the proportions thereof were 30:70 in terms of bone dry weight, and 130 parts by weight of water, relative to 100 parts by weight of the bamboo fibre in the bone dry state, was added.

To prepare a test piece, bamboo fibre having its moisture content adjusted in advance to 100% by weight with the use of a sprayer and ordinary Portland cement were kneaded uniformly, and then a magnesium nitrate solution prepared by completely dissolving magnesium nitrate into the remaining 30 parts by weight of water was added uniformly to the kneaded material by means of a sprayer. The quantity of magnesium nitrate added was 4.2% by weight relative to the solid raw materials. The magnesium nitrate used was the special-grade reagent magnesium nitrate hexahydrate [Mg(NO$_3$)$_2$·6H$_2$O] manufactured by Kanto Kagaku Kabushiki Kaisha.

The resulting kneaded material was moulded into uniform mats of 180 mm in length×100 mm in width×70 mm in thickness on an iron plate, which was placed together with the iron plate in 40 layers on a dolly for pressing and was then press-compressed using a pressure of 20 kgf/cm$^2$ so that the thickness of the mats became 12 mm. The iron plates were fastened by clamps, after which removal from the press was performed and primary curing was conducted in the state of pressure-fastening, followed by detachment. The moulded bodies which had been detached were then submitted successively to secondary curing. The primary curing was set to be steam curing at 60° C. for 8 hours. For the secondary curing, ordinary curing was performed for 14 days.

With part of the detached moulded bodies, the flexural strength was measured in the same manner as in Example 1. Readiness for detachment was also examined at the same time. Evaluation as in Example 1 was implemented for the moulded bodies after the secondary curing.

The measurement results are shown in Table 3.

EXAMPLE 6

Example 5 was repeated except that the moulded body was submitted to 2-hour ordinary curing as pre-curing before the primary curing. The measurement results are shown in Table 3.

TABLE 3

|  | Example 5 | Example 6 |
|---|---|---|
| Strength at detachment (kgf/cm$^2$) | 52 | 62 |
| Bulk specific gravity | 1.12 | 1.14 |
| 14-day strength (kgf/cm$^2$) | 103 | 117 |
| $\rho = 1.1$ converted strength of 14-day strength (kgf/cm$^2$) | 99 | 111 |
| Possibility of Detachment | Possible | Possible |

Curing conditions
Example 5: 8 hours at 60° C. as primary curing, 14 days ordinary curing as secondary curing
Example 6: 2 hours ordinary curing as pre-curing, 8 hours at 60° C. as primary curing, 14 days ordinary curing as secondary curing As can be seen from the results in Table 3, the strength at the time of detachment is high and it can be seen that a strength which makes handling possible is reached in a short time. Furthermore, in Example 6 wherein the pre-curing was implemented prior to the heat treatment, the strength immediately after detachment is even higher, making the handling easier.

Industrial Applicability

According to the present invention, by using an extremely simple measure of adding a nitrate as an additive agent, a vegetable fibre cement moulded body of high strength which is not easily affected by substances that inhibit cement hardening and a method of manufacturing the same efficiently and at low cost are provided.

Furthermore, according to the present invention, in addition to adding the nitrate during the step of mixing raw materials or during the moulding step, by implementing a heat treatment for the moulded body during the curing step, a method of manufacturing a vegetable fibre cement moulded body is provided wherein the cement hardening reaction of a material placed on a template does not readily proceed before pressure-fastening, the curing time required from the completion of the fastening up to the detachment step is reduced, and metallic equipment parts involved in the manufacturing of the moulded body are not corroded, and costs are low.

What is claimed is:

1. A vegetable fibre cement moulded body comprising at least a vegetable fibre material and cement characterised in that the vegetable fibre cement moulded body contains a nitrate as an additive agent, wherein the nitrate is 1 or more kinds selected from the group consisting of magnesium nitrate, ferric nitrate and nickel nitrate.

2. A vegetable fibre cement moulded body according to claim 1 wherein the nitrate content is 0.5–10% by weight relative to the total amount of solid raw material.

3. A method of manufacturing a vegetable fibre cement moulded body comprising the steps of mixing a raw material including at least a vegetable fibre material, cement and water, moulding the mixed material, and curing this moulded body, characterised in that a nitrate is added at the time of said raw material mixing step or said moulding step, wherein the nitrate is 1 or more kinds selected from the group consisting of magnesium nitrate, ferric nitrate and nickel nitrate.

4. A method according to claim 3 wherein the nitrate is added in the form of an aqueous solution.

5. A method of manufacturing a vegetable fibre cement moulded body comprising the steps of mixing a raw material including at least a vegetable fibre material, cement and water, moulding the mixed material on a template, stacking multiple layers of composites of this moulded body and the template, pressurising as well as fastening while under pressurisation said stacked multiple layers of composites, curing the fastened moulded bodies until their handling of said moulded body becomes possible, and unfastening and separating said moulded bodies and said template, characterised in that a nitrate is added at the time of said raw material mixing step or moulding step and that a heat treatment is implemented for the moulded bodies in said curing step.

6. A method according to claim 5 wherein the nitrate is 1 or more kinds selected from the group consisting of magnesium nitrate, ferric nitrate and nickel nitrate.

7. A method according to claim 5 wherein the heat treatment is performed at a temperature between 50° C. or more and less than 100° C.

8. A method according to claim 7 wherein the heat treatment is performed at a temperature of 60–80° C.

9. A method according to any one of claims 5 to 8 wherein the heat treatment is steam curing.

10. A method according to any one of claims 5 to 9 wherein ordinary curing is performed before the heat treatment.

11. A method according to any one of claims 5 to 10 wherein secondary curing of the moulded body separated from the template is performed by ordinary curing.

* * * * *